United States Patent [19]

Severson et al.

[11] 3,929,755

[45] Dec. 30, 1975

[54] PYROLYZED ROSIN PRODUCTS AS SYNTHETIC RUBBER TACKIFIERS

[75] Inventors: Ray F. Severson; Walter H. Schuller; N. Mason Joye, Jr.; Ray V. Lawrence, all of Lake City, Fla.

[73] Assignee: The United States of America, as represented by the Secretary of Agriculture, Washington, D.C.

[22] Filed: June 1, 1973

[21] Appl. No.: 365,899

[52] U.S. Cl. .............................. 260/106; 260/27 R
[51] Int. Cl.² ........................................... C09F 1/00
[58] Field of Search .......................... 260/106, 27 R

[56] References Cited
UNITED STATES PATENTS
1,926,676  9/1933  Gubelmann...................... 260/106

OTHER PUBLICATIONS

Canadian Journal of Chem., (pp. 4027–4032).

*Primary Examiner*—Donald E. Czaja
*Assistant Examiner*—William E. Parker
*Attorney, Agent, or Firm*—M. Howard Silverstein; Max D. Hensley

[57] ABSTRACT

Styrene-butadiene synthetic rubber compositions of enhanced building tack from a content therein of from 1 to 15 phr (parts rosin derivative per hundred parts rubber) of pyrolyzed wood rosin and various pyrolyzed vacuum distillation cuts of a wood rosin.

7 Claims, No Drawings

PYROLYZED ROSIN PRODUCTS AS SYNTHETIC RUBBER TACKIFIERS

A non-exclusive, irrevocable, royalty-free license in the invention described herein described throughout the world for all purposes of the United States Government, with the power to grant sublicenses for such purposes, is hereby granted to the Government of the United States of America.

This invention relates to synthetic rubber compositions of enhanced building tack from a content therein of pyrolyzed wood rosin (and pyrolyzed cuts from the vacuum distillation of wood rosin). More particularly, the invention concerns sytrene-butadiene synthetic rubber compositions containing from 1 to 15 phr (based on the rubber content) of wood rosin which has been pyrolyzed at 500°–800°C and at a contact time of from 0.1 to 10 seconds.

Commercially available wood rosin is in general made from the stumps of longleaf (and a very small amount of slash) pine trees, found in the southeastern portion of the United States. The stumps are pulverized, extracted with a hydrocarbon solvent such as gasoline, and steam distilled. The pot residue is termed wood rosin and it generally has a FF color rating on the U.S.D.A. rosin color grade scale. A more detailed account of this industrial process is given in "Encyclopedia of Chemical Technology" Vol. 11, pp. 780–781, Interscience Publishers, Inc., N.Y., N.Y. (1953).

A new source of wood rosin has recently become available from the stumps of the ponderosa pine tree, located mainly in the southwestern portion of the United States, as for example in Arizona. This source of a new type of wood rosin is described in I&EC Prod. Res. and Dev., 8, 297 (1969). The wood rosin from ponderosa stumps differs from the wood rosin from longleaf stumps as is indicated by the following table of properties of the two products made by the same process in the same commercial equipment.

| | FF-Wood Rosin from Ponderosa Stumps from Arizona | FF-Wood Rosin from Longleaf Stumps from Georgia |
|---|---|---|
| Acid No. | 135 | 152 |
| Ball and Ring Softening Point | 142–144°F (61–62°C) | 160°F |
| Crystallization | None in 1 week | 3 days |

It was thus considered of importance to determine if a heat treatment of ponderosa FF-wood rosin, and heat treatment of fractions obtained therefrom by vacuum distillation of ponderosa FF-wood rosin, would be effective as rubber tackifiers for synthetic rubber. It could not be predicted in advance whether this new type of rosin would give products useful in this application upon heat treatment. Rubber tackifiers are used in large amounts, especially in styrene-butadiene rubbers, in the manufacture of, for example, automobile tires.

Accordingly, ponderosa FF-wood rosin was pyrolyzed at about 700°C and the product tested as a rubber tackifier by the standard Tel-Tak test, routinely employed in the industry. It was found to be very active as a rubber tackifier. The ponderosa rosin before heating was not useful in this application. Two commercial rosin oils commercially sold as rubber tackifiers were found to be less effective as rubber tackifiers than the pyrolyzed ponderosa FF-wood rosin. Also, tall oil rosin pyrolyzed at 700°C was found to be a poor tackifier. Ponderosa FF-wood rosin was vacuum distilled and the fore cut and the pot residue were found to be inactive as rubber tackifiers. However, on pyrolysis at about 700°C, they both showed good activity as rubber tackifiers in the range of 10 phr.

Styrene-butadiene rubber (also frequently designated SBR rubber) is an elastomeric copolymer resulting from emulsion copolymerization of butadiene and styrene in varying ratios, most commonly in a ratio of 70 to 80 parts of butadiene to 30 to 20 parts of styrene, with both cold (i.e. polymerized at about 40°F) and hot (i.e. polymerized at 122°F) type SBR rubbers commercially available. In producing useful rubber products, such as automotive tires, belts, and the like, from synthetic rubber compositions it is necessary to assemble uncured component parts before curing the composition into a unitary product. To facilitate product preparation, it is necessary that assembled uncured parts firmly adhere together through handling operations until the assembly be placed in a mold and cured. The ability of uncured rubber to adhere to another piece of uncured rubber is called building tack. Tackifiers, i.e. materials added to rubber to impart and/or to increase building tack, often must be included to provide adequate building tack in various synthetic rubber compositions so that such useful rubber products may be produced.

The present invention provides new and useful synthetic rubber compositions of enhanced building tack and for each 100 parts by weight of the SBR rubber therein exhibiting enhanced building tack containing therein from 1 to 15 parts by weight of pyrolyzed ponderosa FF-wood rosin or a pyrolyzed cut from a vacuum distillation of same. While amounts as low as 1 phr (based on the synthetic rubber) and as high as 15 phr provide enhancement of building tack amounts, amounts between 2 and 11 phr generally are preferred. Economic considerations indicate that about 15 phr is a practical upper limit on the amount of the modified pine gum to be employed in the rubber compositions.

The pyrolysis procedure applied to the ponderosa FF-wood rosin employs a heated glass (Vycor) tube placked with Vycor rods. Temperatures in the range of 500° to 800°C can be employed at contact times of from 0.01 to 10 seconds. A preferred temperature range is 600°–750°C and at a contact time of from 1 to 6 seconds. The rosin can be run "neat," that is, run in the molten state directly into the pyrolyzer, or it can be run in solution. A suitable solvent is benzene.

EXAMPLE 1

Ponderosa FF-wood rosin prepared as described in I&EC Prod. Res. and Dev., 8, 297–299 (1969) of acid number 136 and ball and ring softening point of 62°C was vacuum distilled as follows. A 1500 gram batch was placed in a 2 liter, 3-necked flask equipped with a thermometer and take off head and the product heated under vacuum and the following fractions taken.

| Fraction | Pot Temp. | Head Temp. | Press | Weight | AN | S.P. | Color |
|---|---|---|---|---|---|---|---|
| 1 | 25–210°C | 25–200°C | 4 mm. | 250 g | 75 | Viscous Liquid | X+ |
| 2 | 210–300°C | 200–235°C | 4 mm | 925 g | 170 | 68°C | X+ |
| 3 (Pot residue | | | | 300 g | 70 | 125°C | Black |
| | | | | 1475 g recovered | | | |

EXAMPLE 2

Ponderosa FF-wood rosin, prepared as described in I&EC Prod. Res. and Dev., 8, 297–299 (1969) and of AN 136 and ball and ring softening point of 62°C was pyrolyzed as follows.

Apparatus

The pyrolysis apparatus consisted of a vertically mounted Cenco Hevi-Duty type 70T electric combustion furnace with a 12 in. heating chamber containing a Vycor glass combustion tube (30 mm OD × 32 cm long with a tapered end having a 3–4 mm opening and 24/40 glass joints sealed at the top and bottom) packed with a ⅛ inch diameter Vycor rod. This tube was connected to an air condenser, an ice trap, a refluxing acetone-dry ice trap and 2 final dry ice traps. A Temco portable indicating pyrometer was used to measure the pyrolysis tube temperature and the temperature controller was used to maintain the temperature at the desired level.

Pyrolysis

The system was allowed to equilibrate at 700°C under a nitrogen flow of 400 ml/min. One hundred grams of Ponderosa FF-wood rosin was placed in a side arm addition funnel and melted by means of a heat lamp. The molten rosin was added dropwise over a period of 6½ hours. The contact time was calculated to be about 4 seconds. The pyrolysate was collected and concentrated on a rotovac at a bath temperature of 30°C and at 40 mm of mercury vacuum to yield 45 g of product of acid number essentially zero.

EXAMPLE 3

Fraction 1 of the vacuum distillation of ponderosa FF-wood rosin, as described in Example 1, of AN 75, and of b.p. range 25°C–200°C, was pyrolyzed essentially as described in Example 2. One hundred grams of the forecut was dissolved in 250 ml of benzene and pyrolyzed at 700°C over an addition time of 7 hours. The contact time was calculated to be about 3.1 seconds. The product was collected and stripped on a Rotovac at a bath temperature of 30°C and a vacuum of 40 mm of Hg. The yield of product was 87 g of acid number of 9.0.

EXAMPLE 4

Fraction 3, or the pot residue, from the vacuum distillation of ponderosa FF-wood rosin, as described in Example 1, was pyrolyzed essentially as in Example 2. One hundred grams of the pot residue was dissolved in 400 ml of benzene and pyrolyzed as described above at 700°C and over an addition time of 10 hours. The contact time was calculated to be 3.3 seconds. The product was stripped on a Rotovac at 30°C pot temp. and 40 mm of Hg. The product weighed 96 g and had an acid number of essentially zero.

EXAMPLE 5

One hundred grams of commercially available Shamrock FF-wood rosin was dissolved in 250 ml of benzene. It was pyrolyzed as described in Example 2 at 700°C and over an addition time of 7 hours. The contact time was calculated to be about 3.1 seconds. The product was collected and stripped on a Rotovac at a bath temperature of 30°C and a vacuum of 40 mm of Hg. The yield was 67.7 grams of acid number 16.0.

EXAMPLE 6

The pyrolyzed ponderosa FF-wood rosin as described in Example 2 was incorporated with styrene-butadiene synthetic rubber as follows and evaluated as a rubber tackifier via the standard Tel-Tak test. So called "hot" SBR rubber is used in the test.

| Test Formulation | PHR |
|---|---|
| SBR 1006 | 100.0 |
| HAF Black | 40.0 |
| Zinc Oxide | 5.0 |
| Stearic Acid | 2.0 |
| Pyrolyzed ponderosa FF-wood resin from Example 2 | 10.0 |

A control is run with each sample containing no added tackifier. A commercial FF-wood rosin made in the same commercial equipment and in the same manner as the ponderosa FF-wood rosin but using mainly longleaf stumps from the southeastern portion of the United States, was used at the same concentration level for comparison. This product is designated as "FF-Com.". In addition, two commercial rosin oils in commercial current use as rubber tackifiers were tested at the same concentration level for comparison purposes. They are designated as Comm R.O. No. 1 and Comm R.O. No. 2. Tel-Tak specimens were prepared by pressing the uncured rubber through a square woven aluminum screen in a tensile mole. The samples were pressed five minutes at 212°F. A sheet of parchment paper was placed on the side nearest the screen. A sheet of Mylar film was pressed against the test surface to be tested for tack. A ¼ inch × 2 inch × 0.070 inch sample was used for the test. The conditions used were a 16 oz. preload for 60 seconds, pulled apart at 2 inches per minute. The Tel-Tak test employed was described in detail at the Division of Rubber Chemistry, American Chemical Society, Los Angeles, California, April 29-May 2, 1969, page 1040–1953, by J. R. Beatty under the title "Tel-Tak: A Mechanical Method for Estimating Both Tackiness and Stickiness of Rubber Compounds." In all cases, by definition, the true tack is equal to the Tack minus the Stickiness or True Tack — (Tack) — (Stickiness).

|  | RESULTS Set No. 1 | | | |
|---|---|---|---|---|
|  | Test | Tack | Stickiness | True Tack |
| Pyrolyzed Ponderosa FF Wood Rosin as described in Example 11 | No. 1 | 24.5 | 19.5 |  |
|  | No. 2 | 27.0 | 14.0 |  |
|  | No. 3 | 27.5 | 16.5 |  |
|  | Av. | 26.3 | 16.7 | 9.6 |
| Control run at same time, no tackifier added | No. 1 | 22.5 | 20.0 |  |
|  | No. 2 | 25.0 | 23.0 |  |
|  | No. 3 | 29.5 | 15.0 |  |
|  | Av. |  |  | 6.4 |
|  | Set No. 2 | | | |
|  | Test | Tack | Stickiness | True Tack |
| Fract. No. 1 of vac. dist. Pond. FF wood rosin as described in Example 1 | No. 1 | 23 | 15 |  |
|  | No. 2 | 24 | 17 |  |
|  | No. 3 | 24 | 17 |  |
|  | Av. | 23.6 | 16.3 | 7.3 |
| Control run at same time, no tackifier added | No. 1 | 29 | 26 |  |
|  | No. 2 | 28 | 21 |  |
|  | No. 3 | 30 | 25 |  |
|  | Av. | 29 | 24 | 5.0 |
|  | Set No. 3 | | | |
|  | Test | Tack | Stickiness | True Tack |
| Pyrolyzed Pot Residue of vac. dist. of Pond. FF wood rosin as described in Example 1 | No. 1 | 28 | 23 |  |
|  | No. 2 | 27 | 24 |  |
|  | No. 3 | 29 | 21 |  |
|  | Av. | 28.0 | 22.7 | 5.3 |
| Control run at same time, no tackifier added | No. 1 | 29 | 26 |  |
|  | No. 2 | 28 | 21 |  |
|  | No. 3 | 30 | 25 |  |
|  | Av. | 29 | 24 | 5.0 |
|  | Set No. 4 | | | |
|  | Test | Tack | Stickiness | True Tack |
| Pyrolyzed FF Comm. Wood Rosin at 700°C in benzene | No. 1 | 29 | 19 |  |
|  | No. 2 | 25 | 22 |  |
|  | No. 3 | 28 | 22 |  |
|  | Av. | 27.3 | 21.0 | 6.3 |
| Control run at same time, no tackifier added | No. 1 | 29 | 26 |  |
|  | No. 2 | 28 | 21 |  |
|  | No. 3 | 30 | 25 |  |
|  | Av. | 29 | 24 | 5.0 |
|  | Set No. 5 | | | |
|  | Test | Tack | Stickiness | True Tack |
| Tall oil rosin pyrolyzed at 600°C in benzene | No. 1 | 23.0 | 19.0 |  |
|  | No. 2 | 28.0 | 21.0 |  |
|  | No. 3 | 28.5 | 23.0 |  |
|  | Av. | 26.5 | 21.0 | 5.5 |
| Control run at same time, no tackifier added | No. 1 | 29.5 | 26.5 |  |
|  | No. 2 | 27.5 | 14.0 |  |
|  | No. 3 | 27.5 | 22.5 |  |
|  | Av. | 28.2 | 21.0 | 7.2 |
|  | Set No. 6 | | | |
|  | Test | Tack | Stickiness | True Tack |
| Fract. No. 3, (pot residue, from Ex. 1, Ponderosa FF wood rosin vac. distillation (not pyrolyzed) | No. 1 | 30.0 | 2 29.5 |  |
|  | No. 2 | 31.0 | 31.5 |  |
|  | No. 3 | 31.0 | 33.0 |  |
|  | Av. | 30.6 | 31.3 | −0.7 |
| Control run at same time, no tackifier added | No. 1 | 29.5 | 25.2 |  |
|  | No. 2 | 31.5 | 28.5 |  |
|  | No. 3 | 31.5 | 19.0 |  |
|  | Av. | 30.8 | 24.3 | 6.5 |
|  | Set No. 7 | | | |
|  | Test | Tack | Stickiness | True Tack |
| Fract. 1 from Ex. 1 of vac. dist. of Ponderosa FF Wood Rosin (not pyrolyzed) | No. 1 | 34.0 | 38.5 |  |
|  | No. 2 | 34.0 | 32.0 |  |
|  | No. 3 | 34.0 | 35.0 |  |
|  | Av. | 34.0 | 35.1 | −1.1 |
| Control run at same time, no tackifier added | No. 1 | 29.5 | 25.5 |  |
|  | No. 2 | 31.5 | 28.5 |  |
|  | No. 3 | 31.5 | 19.0 |  |
|  | Av. | 30.8 | 24.3 | +6.5 |
|  | Set No. 8 | | | |
|  | Test | Tack | Stickiness | True Tack |
| Comm. R. O. No. 1 | No. 1 | 32.0 | 18.0 |  |
|  | No. 2 | 30.0 | 22.5 |  |

-continued

RESULTS

Set No. 1

|  | Test | Tack | Stickiness | True Tack |
|---|---|---|---|---|
|  | No. 3 | 31.0 | 27.0 |  |
|  | Av. | 31.0 | 22.5 | +8.5 |
| Control run at same | No. 1 | 28.5 | 20.5 |  |
| time, no tackifier | No. 2 | 28.0 | 18.0 |  |
| added | No. 3 | 30.0 | 22.0 |  |
|  | Av. | 28.8 | 20.2 | +8.6 |

Set No. 9

|  | Test | Tack | Stickiness | True Tack |
|---|---|---|---|---|
| Comm. R. O. No. 2 | No. 1 | 32.0 | 30.0 |  |
|  | No. 2 | 33.5 | 25.0 |  |
|  | No. 3 | 30.0 | 27.5 |  |
|  | Av. | 31.8 | 27.5 | +4.3 |
| Control run at same | No. 1 | 28.5 | 20.5 |  |
| time, no tackifier | No. 2 | 28.0 | 18.0 |  |
| added | No. 3 | 30.0 | 22.0 |  |
|  | Av. | 28.8 | 20.2 | +8.6 |

Set No. 10

|  | Test | Tack | Stickiness | True Tack |
|---|---|---|---|---|
| Ponderosa FF | No. 1 | 30.0 | 37.5 |  |
| Wood Rosin (Not | No. 2 | 34.0 | 33.5 |  |
| pyrolyzed) | No. 3 | 30.0 | 36.5 |  |
|  | Av. | 31.3 | 35.8 | −4.5 |
| Control run at same | No. 1 | 28.5 | 20.5 |  |
| time, no tackifier | No. 2 | 28.0 | 18.0 |  |
| added | No. 3 | 30.0 | 22.0 | +8.6 |

We claim:

1. A process for making ponderosa FF wood rosin effective as a rubber tackifier which process comprises pyrolyzing said rosin at a temperture of about 500°–800°C in the absence of catalyst for a period of about 0.01 to 10 seconds.

2. A process for producing pyrolyzed ponderosa FF-wood rosin effective as a rubber tackifier, said process comprising:

a. introducing said rosin in liquid form into a pyrolysis apparatus consisting essentially of a glass tube packed with glass rods, the apparatus heated to a temperature of from 500° to 800° C.;

b. allowing the rosin to pyrolyze in said apparatus for from 0.01 to 10 seconds; and c. recovering said pyrolyzed rosin.

3. The process of claim 2 wherein the rosin is the forecut of vacuum distilled wood rosin.

4. The process of claim 2 wherein the rosin is the pot residue of vacuum distilled wood rosin.

5. The rubber tackifier produced by the process of claim 1.

6. The rubber tackifier produced by the process of claim 3.

7. The rubber tackifier produced by the process of claim 4.

* * * * *